Aug. 28, 1928.
C. B. BACKER
1,682,467
ELECTRIC IRON
Filed June 16, 1926
2 Sheets-Sheet 1
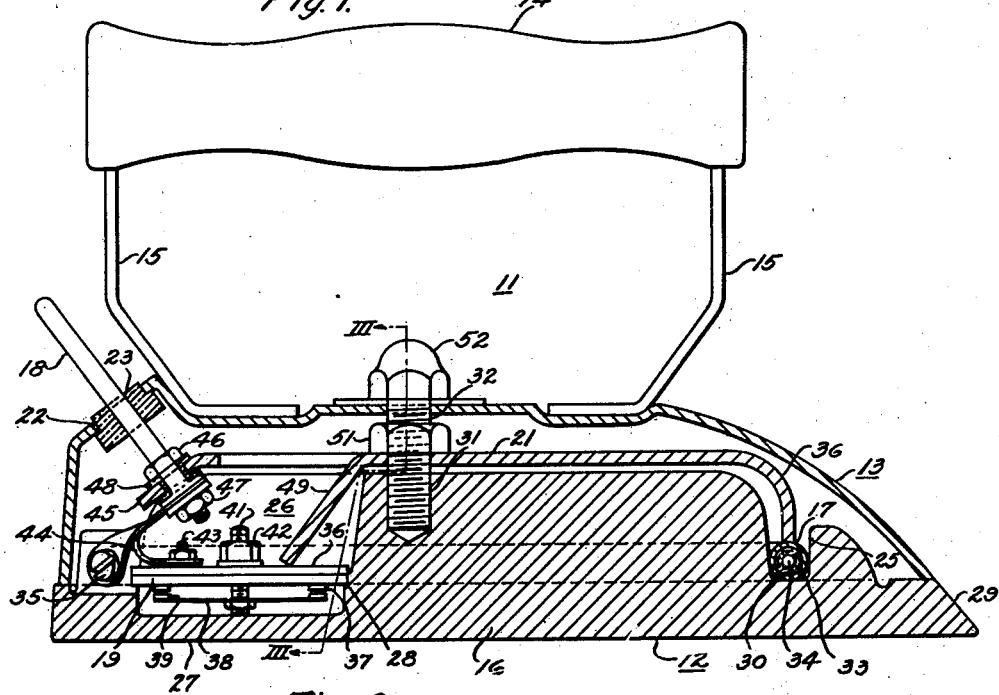
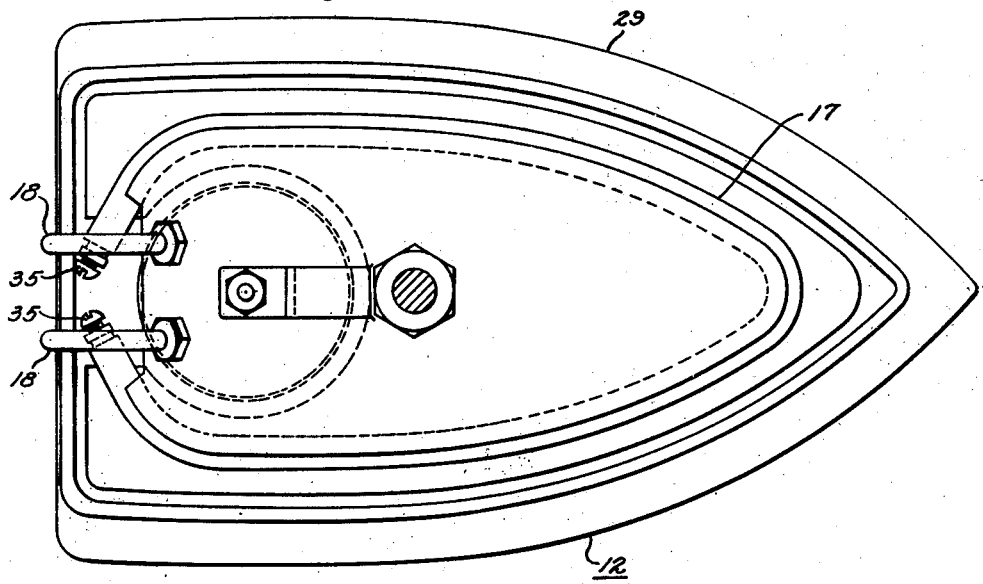
WITNESSES:
INVENTOR
Christian B. Backer.
BY Wesley G. Carr
ATTORNEY Aug. 28, 1928.
C. B. BACKER
1,682,467
ELECTRIC IRON
Filed June 16, 1926      2 Sheets-Sheet 2
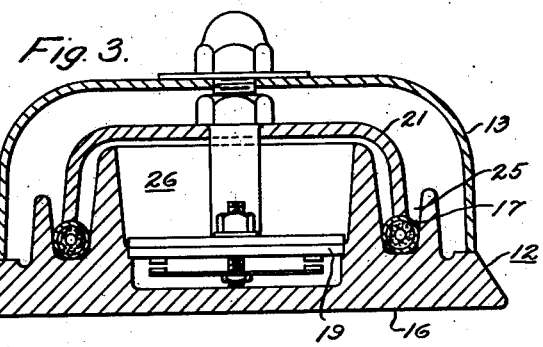
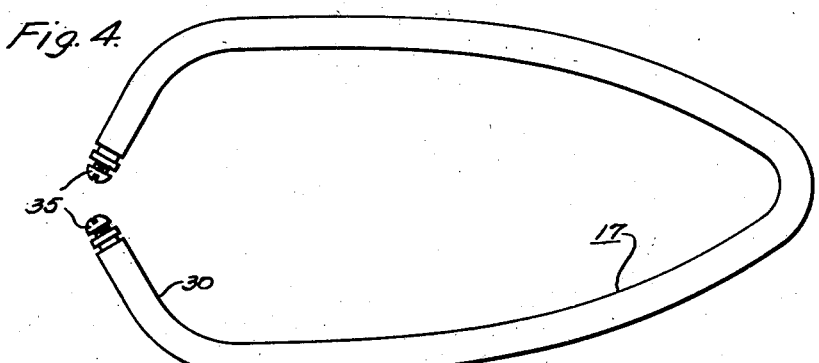
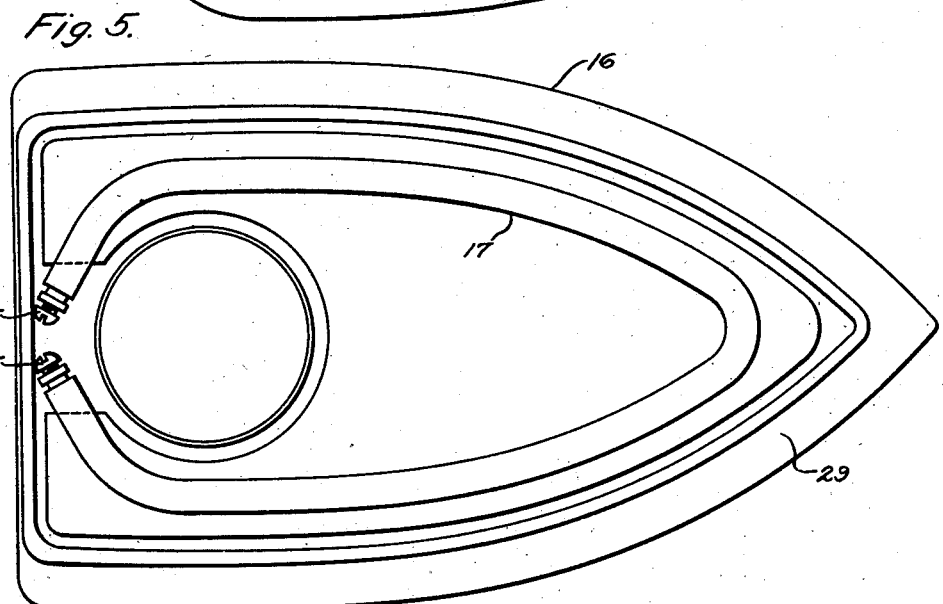
INVENTOR
Christian B. Backer.
BY
Wesley G. Carr
ATTORNEY Patented Aug. 28, 1928.

1,682,467

UNITED STATES PATENT OFFICE.

CHRISTIAN B. BACKER, OF BROOKLYN, NEW YORK.

ELECTRIC IRON.

Application filed June 16, 1926. Serial No. 116,268.

My invention relates to electrically heated devices and particularly to electrically heated sad irons.

An object of my invention is to provide an electrically heated sad iron that is simple in construction and in manufacture.

Another object of my invention is to provide an electrically heated sad iron having a heating unit that can be easily manufactured, and which will be in close thermal engagement with the portion to be heated.

Another object of my invention is to provide a heating unit for electrically heating the sad iron, which shall have a high thermal conductivity and have long life.

Another object of my invention is to provide an electrically heated sad iron that shall operate at substantially constant temperature.

In practicing my invention, I provide an electrically heated sad iron comprising a body portion and a cover member having a handle attached thereto in a manner well known in the art. The body portion comprises a pressing casting, an encased heating element located in close thermal relation with the pressing casting, terminal members, a thermally actuable device for controlling the temperature of the pressing casting and a single member for supporting the terminals, for maintaining the heating element in close thermal relation with the pressing casting and for maintaining the thermally actuable device in operative relation therewith.

In the accompanying drawings,

Figure 1 is a view, in longitudinal vertical cross section, of a device embodying my invention, Fig. 2 is a plan view of the body portion of the device illustrated in Fig. 1, Fig. 3 is a view, in vertical lateral section, of the device illustrated in Fig. 1, taken on line III—III thereof, Fig. 4 is a top plan view of the tubular heating element employed in the device, and Fig. 5 is a plan view of the pressing casting and the tubular heating element of the device illustrated in Fig. 1.

Referring more particularly to Fig. 1, an electrically heated sad iron 11 comprises a body portion 12, a cover member 13 and a handle 14 attached thereto by straps 15 and secured to the cover member 13 in any manner well known in the art.

The body portion 12 comprises a pressing casting 16, a tubular heating element 17, a plurality of terminal members 18 therefor, a thermally actuable control switch 19 and a clamping member 21. An opening 22 is provided in the rear portion of the cover member 13 whereby the terminal members 18 may be brought out from the member 21. An insulating bushing 23 is provided to insulate the terminal 18 from the cover member 13.

The pressing casting 16 is a one-piece structure having a peripheral groove 25 located in the upper surface thereof wherein the heating element is located. The rear portion of the pressing member 16 has a circular recess 26 extending downward towards the ironing surface 27 of the casting member 16, and a circular shoulder 28 is provided therein whereon the thermostat 19 is supported. The edge 29 of the casting member 16 is so bevelled that the casting member presents a neat appearance. The surfaces 27 and 29 are ground and polished to conform with the polished cover member 13 and also to provide a surface that will permit of quick disposal of heat to material to be ironed. A tapped hole 31 is provided in the top central portion of the casting member 16 wherein a stud 32 may be inserted to hold the clamping member 21 and the cover member 13 in operative relation with the casting member 16.

The surface 27 of the casting member 16 is plated with a coating of copper and then with a coating of nickel. The presence of the coating of nickel on the surfaces 27 and 29 serve to provide a highly polished metallic surface and the presence of the copper and nickel coatings in the groove 25 serves to provide a good thermal contact surface for the heating unit 17, as the thermal conductivity of the copper and nickel surface is higher than the conductivity of the cast iron comprising the casting member 16. By reason of the electro-plated surface of the groove 25, a greater amount of heat may be conducted from the heating unit 17 thereby allowing the heating unit 17 to be operated at a lower temperature while still obtaining a desired temperature at the pressing surface. The heating unit will, therefore, have a longer life.

The tubular heating member 17 comprises metal tubular member 30, a metallic sheet or helix of initially metallic magnesium 33 a helically wound resistor member 34, and terminal members 35 attached to the end of the tubular member 30. The heating unit 17 is treated according to the method described in the United States Letters Patent No. 1,451,755, whereby the metallic magnesium 33 is transformed to magnesium oxide thereby forming a compact layer of electric-insulating and highly heat-conductive material from the resistor member 34 to the tube 30.

The thermally-actuable control device 19 comprises a metal base member 36, a plurality of contact members 37 insulatedly mounted thereon, a substantially circular bimetal disc 38 and a plurality of contact members 39 insulatedly mounted on the disc, corresponding in number to the contact members 37. The disc 38 is supported from the base 36 by a single central stud 41, a lock nut 42 being provided to secure the stud in properly adjusted position. A plurality of terminal members 43 are insulatedly mounted on the upper surface of the base member 36 flexbile conductors 44 connecting the terminals 43 to one of the contact pins 18 and to one of the terminals 35. The general construction of the thermally actuable switch 19 is disclosed and claimed in Patent No. 1,561,437.

The terminal pins 18 are supported by a rear portion 45 of the clamping member 21, that is bent angularly downwardly. Nuts 46 and 47 and insulating bushings 48 are provided on the pins 18 to securely clamp them on the portion 45.

The clamping member 21 is substantially triangular in contour and is provided with a depending peripheral portion, shown more particularly in Fig. 3, to securely and resiliently clamp the heating unit in the groove 17. An integral depending portion 49 has its end engaging the base plate 36 of the switch assembly 19 to securely and resiliently hold it in the recess 26 and against the shoulder portion 28. A nut 51 on the stud 32 holds the clamping member 21 in its proper operative position and a nut 52 holds the cover member 13 tightly against the upper peripheral edge of the casting 12.

The heat generated in the resistor 34 by the passage of an electric current therethrough, is quickly conducted to the tube 30, and from there to the walls of the grooves 25, from where it is distributed through the pressing casting 16 and to the operating surface 27. By properly locating the groove 25 in the member 16, I obtain a uniform distribution of the heat over the surface 27. I find also that the close engagement between the outer surface of the tube 30 and the casting 16 ensures a very low drop in temeprature therebetween, and the result is that the heat generated in the heating unit will flow to the operating surface 27, with but little drop, when and as needed during use of the iron.

The disc 38 is so located as to be subjected to the heat of the lower portion of the casting, that is, it will be actuated more particularly by, or in accordance with, the temperature of the operating surface 27. Automatic control of the energization of the heating unit will thus be effected in accordance with the temperature of the ironing surface 27, and therefore in accordance with the demands made on the iron during operation thereof.

While I have illustrated and described a heating unit comprising a tubular member, I do not desire to be restricted thereto, as I may omit the tube and secure the resistor member and enclosing layer of magnesium oxide in the groove 25 in the manner described in my above numbered patent.

Various modifications may be made in the device embodying my invention without departing from the spirit and scope, and I, therefore, desire that only such limitations shall be placed thereon as are imposed by the prior art.

I claim as my invention:

1. In an electrically heated device, the combination with a body portion comprising a heating element, terminal pins, and a thermally-actuable control switch, of a single member for supporting the terminal pins and for directly engaging the switch to hold it in proper operative position.

2. In an electrically heated device, the combination with a body portion comprising a pressing member having a groove in the upper surface thereof, a tubular heating element located therein, and terminal pins for said heating element, of means for supporting said terminal pins in proper operative relation relatively to the body portion, said means having a depending peripheral flange portion for directly engaging and compressively holding said heating element in thermally conductive relation in said groove.

3. In an electrically heated device, the combination with a body portion comprising a pressing member having a peripheral groove in the upper surface thereof, means located in said groove for heating said pressing member comprising a resistor member enclosed within a tube of highly conductive metal and insulated therefrom, and terminal members for said heating element, of means having a depending peripheral portion for supporting said terminal members in proper operative position relatively to said body portion, the edge of the depending peripheral portion directly engaging the tube of the heating means for compressively holding it in thermally conductive relation in said groove.

4. In an electrically heated device, the combination with a body portion comprising a pressing member having a peripheral groove in the upper surface thereof, of means located in said groove for heating said pressing casting comprising a preshaped resistor member enclosed within a sheath of expansively oxidizable material, a tube enclosing said resistor and sheath whereby said resistor is electrically insulated from, and compressively held in, thermally-conductive relation therewith, terminal members for the resistor, a thermally actuable switch associated with said resistor for maintaining the temperature of the bottom surface of said pressing casting substantially constant, and a single clamping member having a peripheral depending portion and an integral depending portion intermediate the periphery, the bottom edge of the peripheral portion directly engaging the heater tube to press it in the groove, and the lower edge of the depending intermediate portion directly engaging the switch to hold it in proper operative position.

5. In an electrically heated device, the combination with a body portion comprising a pressing member having a peripheral groove of substantially U-shape in the upper surface and a partially circular depression, a tubular member enclosing an electric resistor and insulated therefrom located in said groove, a thermally-actuable means electrically associated with said heating element and located in said partially circular depression, and terminals for said resistor, of a single member having depending portions thereon which support said terminals and press said thermally-actuable means in to close thermal relation with the aforesaid body portion.

6. In an electrically heated device, the combination with a body portion comprising a pressing member having a peripheral groove and a substantially circular depression in the top surface thereof, a tubular heating element located in said peripheral groove, a thermally actuable switch electrically associated with said heating element and disposed within said circular depression in thermal relation with said pressing casting, and terminals for said heating element, of a single member having a depending peripheral portion and an intermediate depending portion, the edge of the depending peripheral portion pressing said tubular element into operative relation with said body portion and the intermediate depending portion pressing the switch into the substantially circular depression.

7. In an electrically heated device, the combination with a body portion comprising a heating element, terminal members, a thermally actuable control switch electrically associated with said heating element and thermally associated with the body portion, of a single clamping member for supporting the terminals and for pressing the switch in proper operative relation with said body portion.

In testimony whereof, I have hereunto subscribed my name this 22nd day of May, 1926.

CHRISTIAN B. BACKER.